United States Patent
Tomizu

(10) Patent No.: US 8,515,463 B2
(45) Date of Patent: Aug. 20, 2013

(54) MOBILE COMMUNICATION METHOD AND MOBILE TERMINAL

(75) Inventor: Makoto Tomizu, Yokohama (JP)

(73) Assignee: Kyocera Corporation, Kyoto (JP)

( * ) Notice: Subject to any disclaimer, the term of this patent is extended or adjusted under 35 U.S.C. 154(b) by 753 days.

(21) Appl. No.: 12/298,495

(22) PCT Filed: Apr. 26, 2007

(86) PCT No.: PCT/JP2007/059059
§ 371 (c)(1),
(2), (4) Date: Aug. 24, 2009

(87) PCT Pub. No.: WO2007/125997
PCT Pub. Date: Nov. 8, 2007

(65) Prior Publication Data
US 2010/0020775 A1     Jan. 28, 2010

(30) Foreign Application Priority Data
Apr. 26, 2006 (JP) ................................ P2006-122688

(51) Int. Cl.
| | |
|---|---|
| H04W 68/00 | (2009.01) |
| H04W 36/00 | (2009.01) |
| H04W 4/00 | (2009.01) |
| H04B 7/00 | (2006.01) |
| H04B 7/216 | (2006.01) |
| H04L 12/66 | (2006.01) |

(52) U.S. Cl.
USPC ........... 455/458; 455/445; 370/338; 370/310; 370/352; 370/335

(58) Field of Classification Search
USPC ............. 455/552.1, 553.1, 458, 426.1, 432.1, 455/436–443, 435.1, 435.3; 370/331, 352, 370/356
See application file for complete search history.

(56) References Cited

U.S. PATENT DOCUMENTS
6,560,457 B1 * 5/2003 Silver et al. ................... 455/445
7,876,729 B1 * 1/2011 Grilli et al. .................... 370/332
(Continued)

FOREIGN PATENT DOCUMENTS
| JP | 2002217986 A | 8/2002 |
|---|---|---|
| JP | 2004088532 A | 3/2004 |
| JP | 2006087092 A | 3/2006 |

OTHER PUBLICATIONS

TIA/EIA "cdma 2000 High Rate Packet Data Air Interface" 3GPP2 C.S. 0024 Version 4.0, Section 8.5.6.1 and 9.3.1.1.2.3.2, pp. 8-64, 8-65 and 8-70, Jan. 2002.

(Continued)

*Primary Examiner* — Kent Chang
*Assistant Examiner* — Nathan Brittingham
(74) *Attorney, Agent, or Firm* — DLA Piper LLP (US)

(57) ABSTRACT

A mobile communication method, in which communication is performed using the 3G1X protocol prescribing that mobile terminal MS receives a paging message from a 1x base station through an EV-DO base station, includes the steps of: receiving, at the mobile terminal MS, the paging message through the EV-DO base station BS#1 after starting use of the 3G1X protocol; and transmitting a paging response message for the paging message addressed to the mobile terminal MS to the 1x base station BS#1 without receiving the broadcast information from the 1x base station BS#1, after stopping use of the 3G1X protocol in response to reception of the paging message addressed to the mobile terminal MS.

6 Claims, 13 Drawing Sheets

(56) References Cited

U.S. PATENT DOCUMENTS

| | | | |
|---|---|---|---|
| 2004/0043793 A1 | 3/2004 | Sakata | |
| 2004/0185879 A1* | 9/2004 | Kong et al. | 455/458 |
| 2005/0276273 A1* | 12/2005 | Oprescu-Surcobe et al. | 370/401 |
| 2006/0056342 A1 | 3/2006 | Lee | |
| 2006/0182069 A1* | 8/2006 | Yu | 370/335 |
| 2006/0251058 A1* | 11/2006 | Xu et al. | 370/352 |

OTHER PUBLICATIONS

TIA/EIA "cdma 2000 High Rate Packet Data Air Interface" 3GPP2 C.S. 0024 Version 1.0, Section 14.2.1.3.1.1 and 14.3.1.3.1.1, pp. 14-71, 14-72, 14-21, 14-22 and 14-23, Apr. 2004.

International Search Report for corresponding PCT application PCT/JP2007/059059.

\* cited by examiner

FIG. 10

| MOBILE TERMINAL ID | 1x NETWORK ID | 1x BASE STATION ID | EV-DO NETWORK ID | EV-DO BASE STATION ID | 3G1X PROTOCOL 3 OPERATION SITUATION |
|---|---|---|---|---|---|
| 0001 | MSC#1 | BS#1 | PCF#1 | BS#1 | ○ |
| ... | ... | ... | ... | ... | ... |

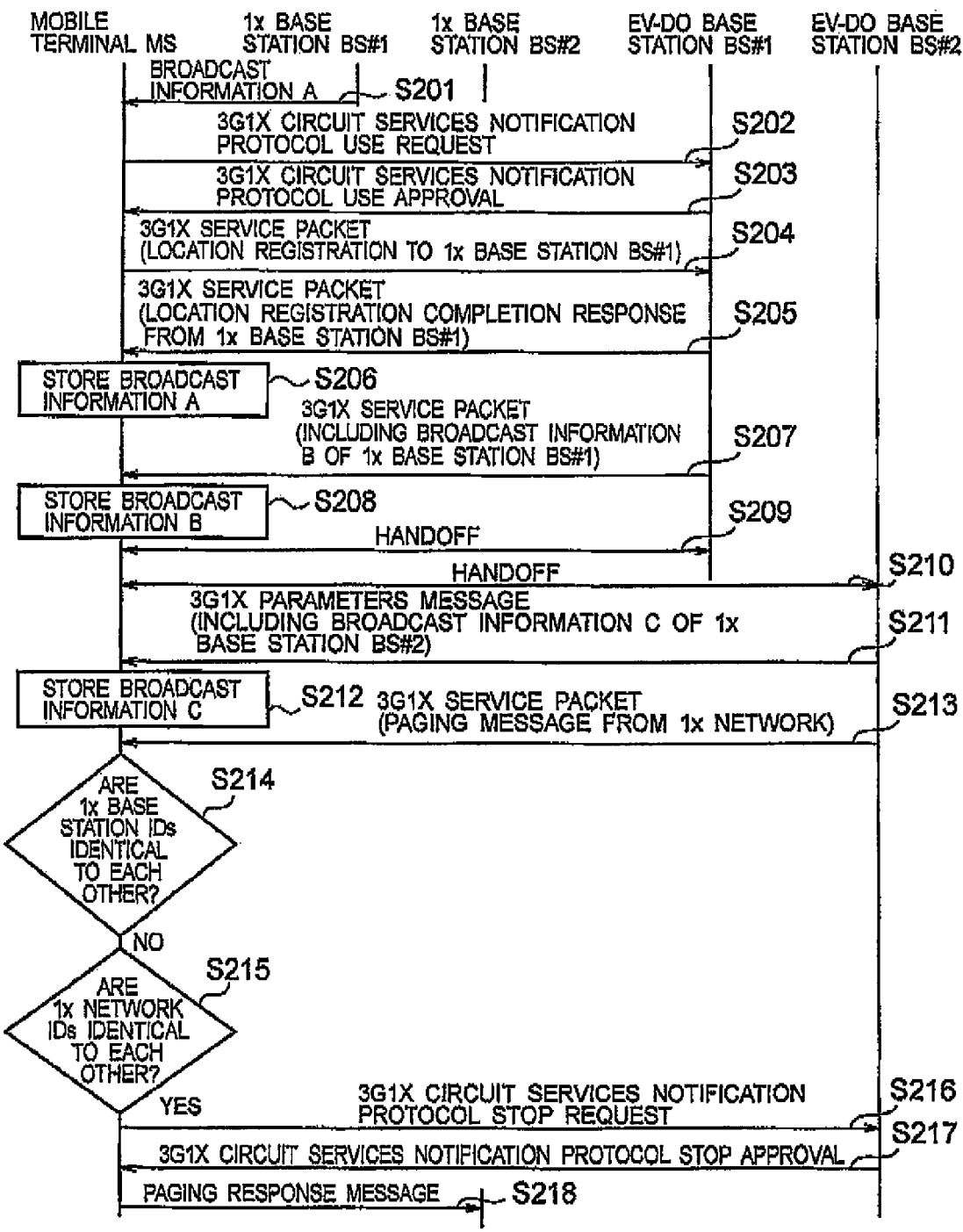

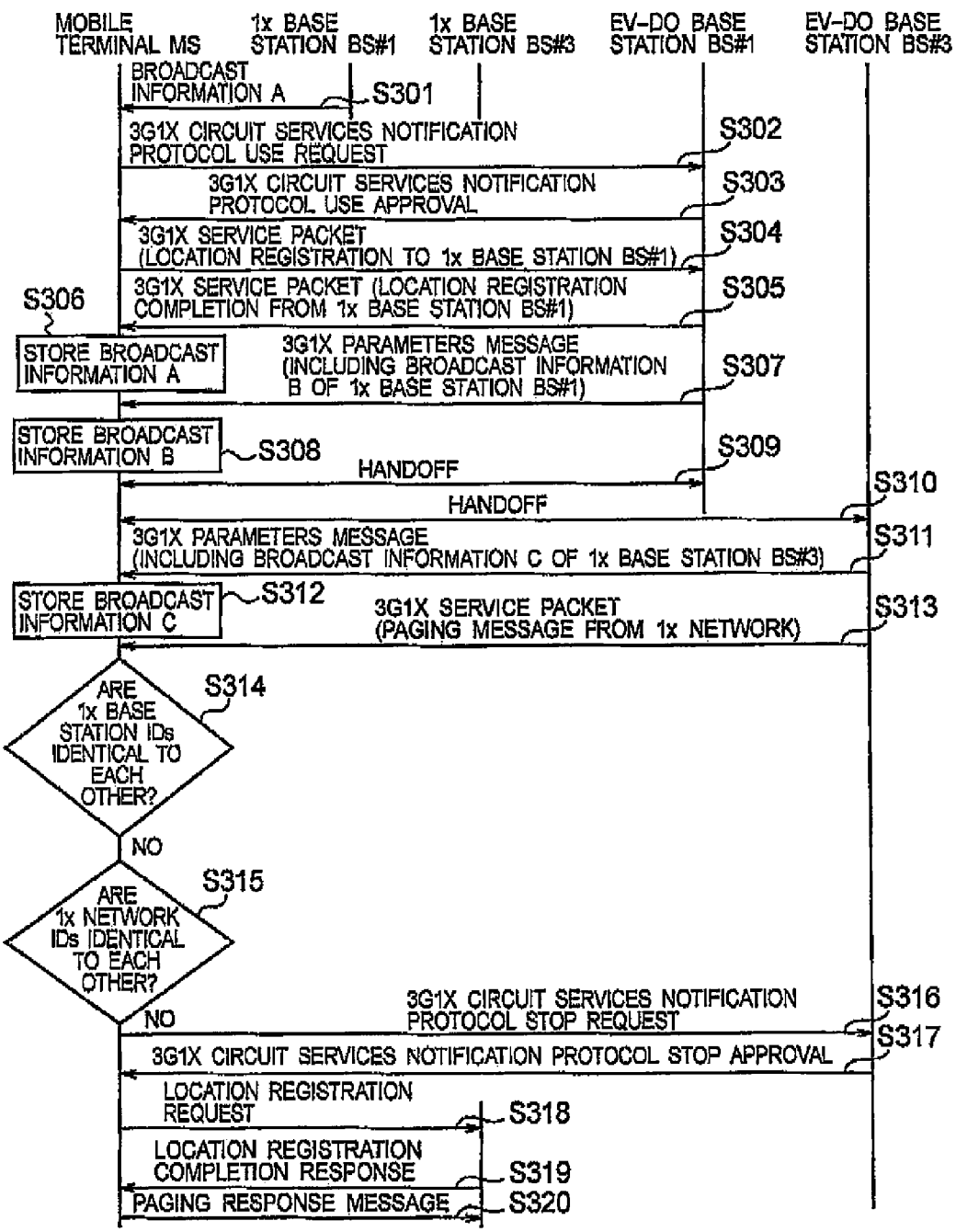

MOBILE COMMUNICATION METHOD AND MOBILE TERMINAL

TECHNICAL FIELD

The present invention relates to a mobile communication method and a mobile terminal for performing communications using a protocol prescribing that the mobile terminal receives a paging message from a circuit switching network base station through a packet switching network base station.

BACKGROUND ART

In recent years, in the "cdma2000 1x-EV DO standard," a protocol (3G1X protocol: 3G1X Circuit Service Notification Protocol) has been developed. The protocol prescribes that a mobile terminal receives a paging message of a 1x network (circuit switching network) using a control channel or a traffic channel that is set for an EV-DO base station (packet switching network base station).

FIG. 1 shows an outline of a mobile communication system in which a mobile terminal MS can communicate using the 3G1X protocol.

Hereinafter, with reference to FIGS. 2 and 3, operation will be described in which the paging message of the 1x network is received while the 3G1X protocol is used, and subsequently, a received call processing in the 1x network is performed in this mobile communication system.

As shown in FIG. 2, at Step S1001, the mobile terminal MS receives broadcast information from a 1x base station BS#1, the broadcast information including a base station ID that identifies the 1x base station BS#1 and a network ID that identifies a mobile switching center MSC#1 connected to the 1x base station BS#1.

At Step S1002, the mobile terminal MS transmits a "3G1X protocol use request" for requesting start of use of the 3G1X protocol to an EV-DO base station BS#1 that is performing a location registration processing.

At Step S1003, in response to the received "3G1X protocol use request," the EV-DO base station BS#1 transmits a "3G1X protocol use approval" for approving start of use of the 3G1X protocol to the mobile terminal MS.

At Step S1004, the mobile terminal MS starts using the 3G1X protocol in response to the received "3G1X protocol use approval," and transmits, to the EV-DO base station BS#1, a "3G1X Service Packet (DO packet including a signaling message of the 1x network)" for informing the 1x base station BS#1 of a location registration request for performing a location registration processing.

The mobile terminal MS is configured not to receive a radio signal from the 1x network while using the 3G1X protocol.

At Step S1005, the EV-DO base station BS#1 transmits, to the mobile terminal MS, a "3G1X Service Packet" for informing the 1x base station BS#1 of a location registration completion response indicating that the location registration processing is completed.

At Step S1006, through a 1x higher order switching center GMSC, an EV-DO higher node PDSN, and a packet control function PCF#1, the EV-DO base station BS#1 is informed of a received call addressed to the mobile terminal MS from an originating terminal through the 1x network. Then the EV-DO base station BS#1 transmits, to the mobile terminal MS, the "3G1X Service Packet" for informing the mobile terminal MS of a paging message addressed to the mobile terminal MS.

Here, the paging message addressed to the mobile terminal MS notifies that there is a received call addressed to the mobile terminal MS from an originating terminal through the 1x network.

At Step S1007, the mobile terminal MS transmits a "3G1X protocol stop request" for requesting stop of use of the 3G1X protocol, to the EV-DO base station BS#1.

At Step S1008, the EV-DO base station BS#1 transmits a "3G1X protocol stop approval" for approving stop of use of the 3G1X protocol to the mobile terminal MS in response to the received "3G1X protocol stop request."

At Step S1009, by receiving broadcast information from a 1x base station BS, the mobile terminal MS confirms BS under which 1x base station the mobile terminal MS is located at present.

At Step S1010, the 1x base stations S#1 and #2 under the mobile switching center MSC#1 inform the mobile terminal MS of the paging message addressed to the mobile terminal MS from the originating terminal through the 1x network.

At Step S1011, the mobile terminal MS determines that the mobile terminal MS has not fallen under the necessity for "1x handoff processing" while using the 3G1X protocol (Step S1004 to S1008), because the base station ID (1x base station BS#1) included in the broadcast information received by the mobile terminal MS at Step S1009 is not changed. Then, in response to the paging massage informed by the 1x base station BS#1 at Step S1010 and received by the mobile terminal MS from the 1x base station BS#1, the mobile terminal MS starts communication with the originating terminal through the 1x network.

Next, with reference to FIGS. 4 and 5, operation will be described for the case where the mobile terminal MS is moved into a cover area of another different 1x base station BS under the same mobile switching center MSC while using the 3G1X protocol, that is, where the base station ID included in the broadcast information received in the mobile terminal MS after the 3G1X protocol is stopped is changed into the base station ID of the different 1x base Station BS under the same mobile switching center MSC.

As shown in FIG. 4, operation from Step S2001 to S2010 is the same as the above-mentioned operation from Step S1001 to S1010.

At Step S2011, the mobile terminal MS determines that the mobile terminal MS is moved into the cover area of a different 1x base station BS under the same mobile switching center MSC#1 white using the 3G1X protocol (Step S2004 to S2008), because the base station ID (1x base station BS#1) included in the broadcast information received by the mobile terminal MS at Step S2009 is changed into another base station ID (1x base station BS#2) of the different 1x base station under the same mobile switching center MSC#1. Then, in response to the paging message informed by the 1x base station BS#2 at Step S2010 and received by the mobile station MS from the 1x base station BS#2, the mobile terminal MS to starts the communication with the originating terminal through the 1x network.

Furthermore, with reference to FIGS. 6 and 7, operation will be described for the case where the mobile terminal MS has fallen under the necessity for "1x handoff processing" between 1x base stations BS under different mobile switching centers MSC while using the 3G1X protocol, that is, where the base station ID included in the broadcast information received in the mobile terminal MS after the 3G1X protocol is stopped is changed into the base station ID of the 1x base station BS under the different mobile switching center.

As shown in FIG. 6, operation from Step S3001 to S3009 is the same as the above-mentioned operation from Step S1001 to S1009.

At Step S3010, the mobile terminal MS determines that the mobile terminal MS has fallen under the necessity for "1x handoff processing" between the 1x base station BS#1 and BS#3 under different mobile switching centers MSC#1 and MSC#2 while using the 3G1X protocol (step S3004 to S3008), because the base station ID (1x base station BS#1) included in the broadcast information received by the mobile terminal MS at Step S3009 is changed into the base station ID (1x base station BS#3) of the 1x base station under the different mobile switching center MSC#2.

Here, the 1x base stations BS#1 and BS#2 under the mobile switching center MSC#1 inform the mobile terminal MS of the paging message addressed to the mobile terminal MS from the originating terminal through the 1x network. Therefore, under this condition, the mobile terminal MS cannot receive the paging message addressed to the mobile terminal MS, and cannot start the communication with the originating terminal through the 1x network. Then, the mobile terminal MS transmits a location registration request to the 1x base station BS#3.

At Step S3011, the 1x base station BS#3 performs the location registration processing for the mobile terminal MS in response to the received location registration request, and to the mobile terminal MS, transmits a location registration completion response for informing that the location registration processing is completed.

At Step S3012, after completion of the location registration processing of the mobile terminal MS, the 1x base station BS#3 under the mobile switching center MSC#2 starts notification of the paging message addressed to the mobile terminal MS from the originating terminal through the ax network. At Step S3013, the mobile terminal MS starts the communication with the originating terminal through the 1x network in response to the paging message received from the 1x base station BS#3.

Nonpatent literature 1: "cdma2000 High Rate Packet Data Air Interface 3GPP2 C.S0024 Version 4.0," 3GPP2, October, 2002 (Section 8.5.6.1, Section 9.3.1.3.2.3.2)

Nonpatent literature 2: "cdma2000 High Rate Packet Data Air Interface 3GPP2 C.S0024-A Version 1.0," 3GPP2, March, 2004 (Section 14.2.1.3.1.1, Section 14.3.1.3.1.1)

DISCLOSURE OF THE INVENTION

However, as mentioned above, in the operation in the conventional mobile communication system, the mobile terminal MS is configured to certainly receive the broadcast information (and is paging message) from the 1x network in order to securely receive the paging message addressed to the mobile terminal MS after stopping use of the 3G1X protocol, irrespective of whether the mobile terminal MS has fallen under the necessity for "1x handoff processing" between the 1x base stations BS under the different mobile switching centers MSC while using the 3G1X protocol, that is, irrespective of whether the base station ID included in the broadcast information received in the mobile terminal MS is changed into the base station ID of another 1x base station under the different mobile switching center.

Therefore, the mobile communication system has had a problem of increase of time needed for the operation to perform a received call processing in the 1x network after receiving the paging message of the 1x network while using the 3G1X protocol.

In addition, the mobile communication system has had a problem that the mobile terminal MS may fail to receive the paging message addressed to the mobile terminal MS.

Then, the present invention is made in consideration of the above-mentioned points. An objective of the present invention is to provide a mobile communication method and a mobile terminal that enable faster execution of operation to perform a received call processing in the 1x network after receiving a paging message of a 1x network while using the 3G1X protocol.

A first aspect of the present invention is summarized by a mobile communication method for performing communications using a protocol prescribing that a mobile terminal receives a paging message from a circuit switching network base station through a packet switching network base station, the mobile communication method comprising the steps of: receiving, at the mobile terminal, the paging message through the packet switching network base station after starting use of the protocol; and transmitting, from the mobile terminal to the circuit switching network base station, a paging response message for the paging message addressed to the mobile terminal without receiving broadcast information from the circuit switching network base station, after stopping use of the protocol in response to reception of the paging message addressed to the mobile terminal.

In the first aspect of the present invention, the mobile communication method may further comprise the steps of receiving, at the mobile terminal, first broadcast information from a first circuit switching network base station before starting use of the protocol, the first broadcast information including a first network ID that identifies a mobile switching center connected to the first circuit switching network base station; receiving, at the mobile terminal, second broadcast information from the packet switching network base station after starting use of the protocol, the second broadcast information including a second network ID that identifies a mobile switching center connected to a second circuit switching network base station, and performing a location registration processing to the second circuit switching network base station without receiving the broadcast information from the first and second circuit switching network base stations, and transmitting a paging response message for the paging message addressed to the mobile terminal to the second circuit switching network base station, after stopping use of the protocol in response to reception of the paging message addressed to the mobile terminal when the first network ID is different from the second network ID, at the mobile terminal.

A second aspect of the present invention is summarized as a mobile terminal configured to communicate using a protocol prescribing that the mobile terminal receives a paging message from a circuit switching network base station through a packet switching network base station, the mobile terminal including: a paging message receiver configured to receive the paging message through the packet switching network base station after use of the protocol is started; and a paging response message transmitter configured to transmit, to the circuit switching network base station, a paging response message for the paging message addressed to the mobile terminal without receiving broadcast information from the circuit switching network base station, after stopping use of the protocol in response to reception of the paging message addressed to the mobile terminal.

In the second aspect of the present invention, the mobile a terminal may further include: a first broadcast information receiver configured to receive first broadcast information from a first circuit switching network base station before use of the protocol is started, the first broadcast information including a first network ID that identifies a mobile switching center connected to the first circuit switching network base station; a second broadcast information receiver configured to receive second broadcast information from the packet switching network base station after use of the protocol is started, the second broadcast information including a second network ID that identifies a mobile switching center connected to a second circuit switching network base station; a comparison unit configured to compare the first network ID with the second network ID; and a location registration processor configured to perform a location registration processing to the second circuit switching network base station without receiving broadcast information from the first and second circuit switching network base stations, after stopping use of the protocol in response to reception of the paging message addressed to the mobile terminal, when the first network ID is different from the second network ID, wherein the paging response message transmitter is configured to transmit, to the second circuit switching network base station, a paging response message for the paging message addressed to mobile terminal, after completion of the location registration processing to the second circuit switching network base station.

BRIEF DESCRIPTION OF TEE DRAWINGS

Figure 3:
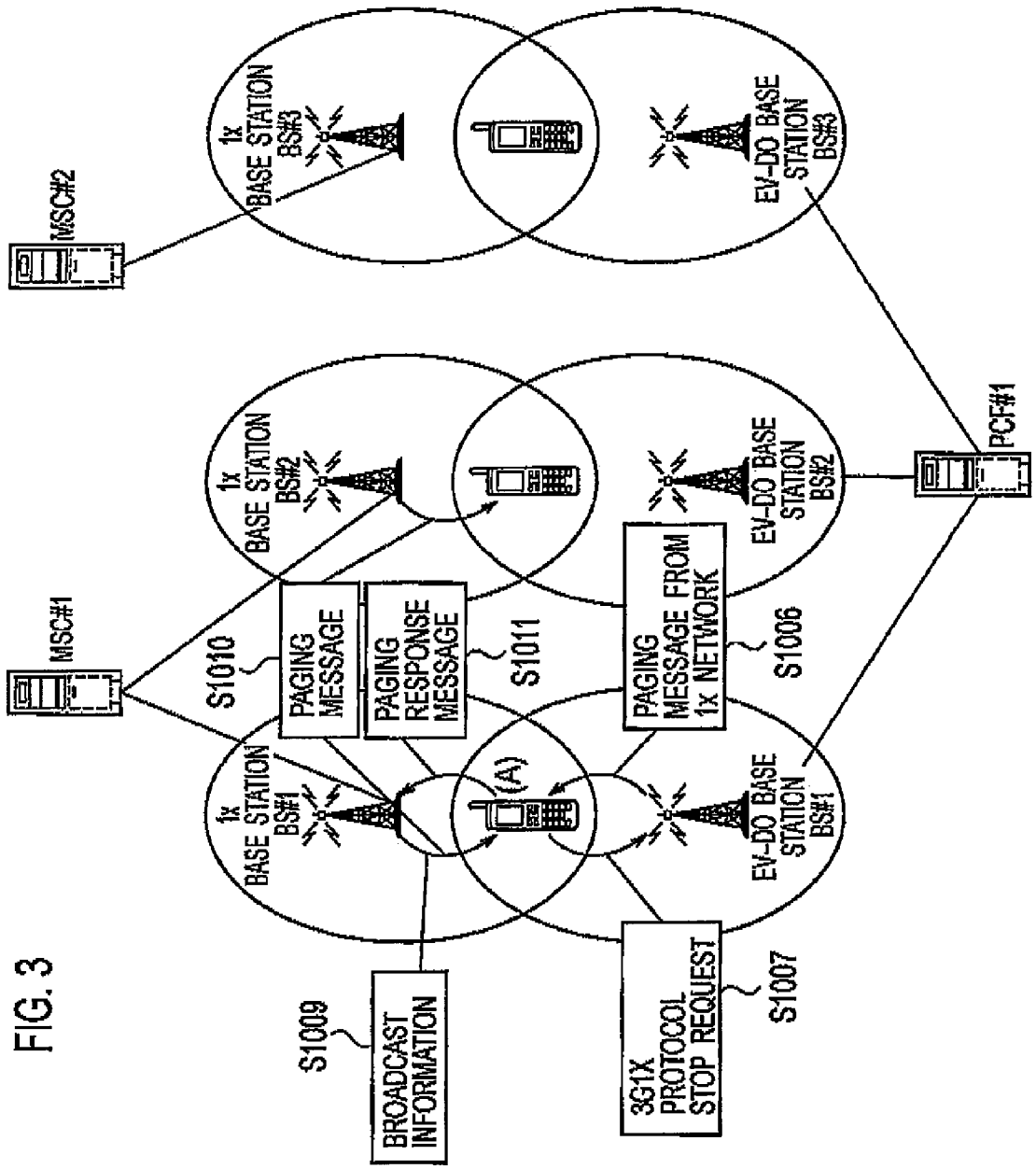

FIG. 3 is a diagram for describing operation to receive a paging message of the 1x network while using the 3G1X protocol, and to perform a received call processing in the 1x network in the mobile communication system according to the conventional art (when the 1x handoff has not occurred).

Figure 4:
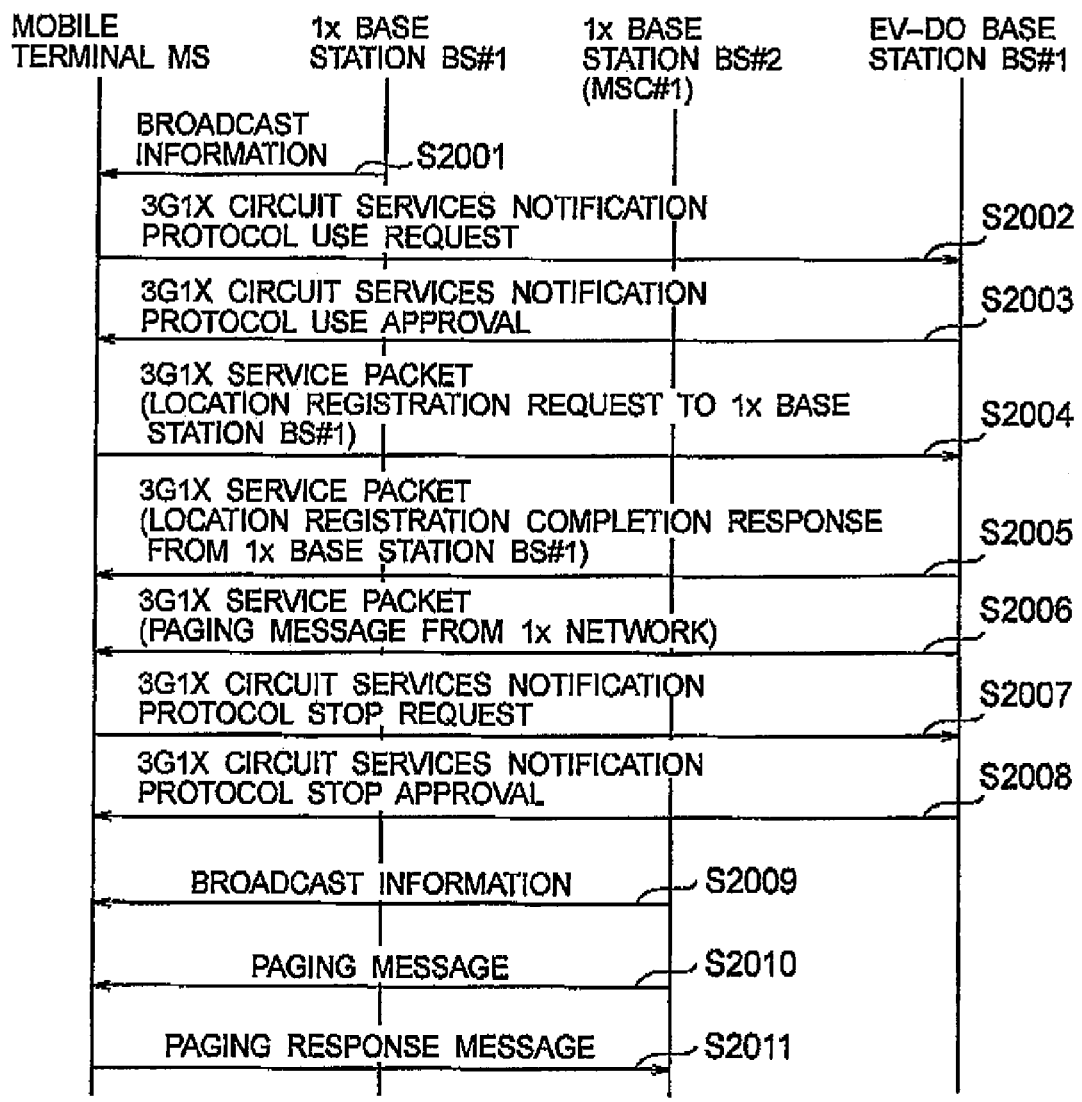

FIG. 4 is a sequence diagram showing operation to receive a paging message of the 1x network while using the 3G1X protocol, and to perform a received call processing in the 1x network in the mobile communication system according to conventional art (when a mobile station MS is moved into a cover area of another 1x base station BS under the same MSC, and the 1x handoff has not occurred).

Figure 5:
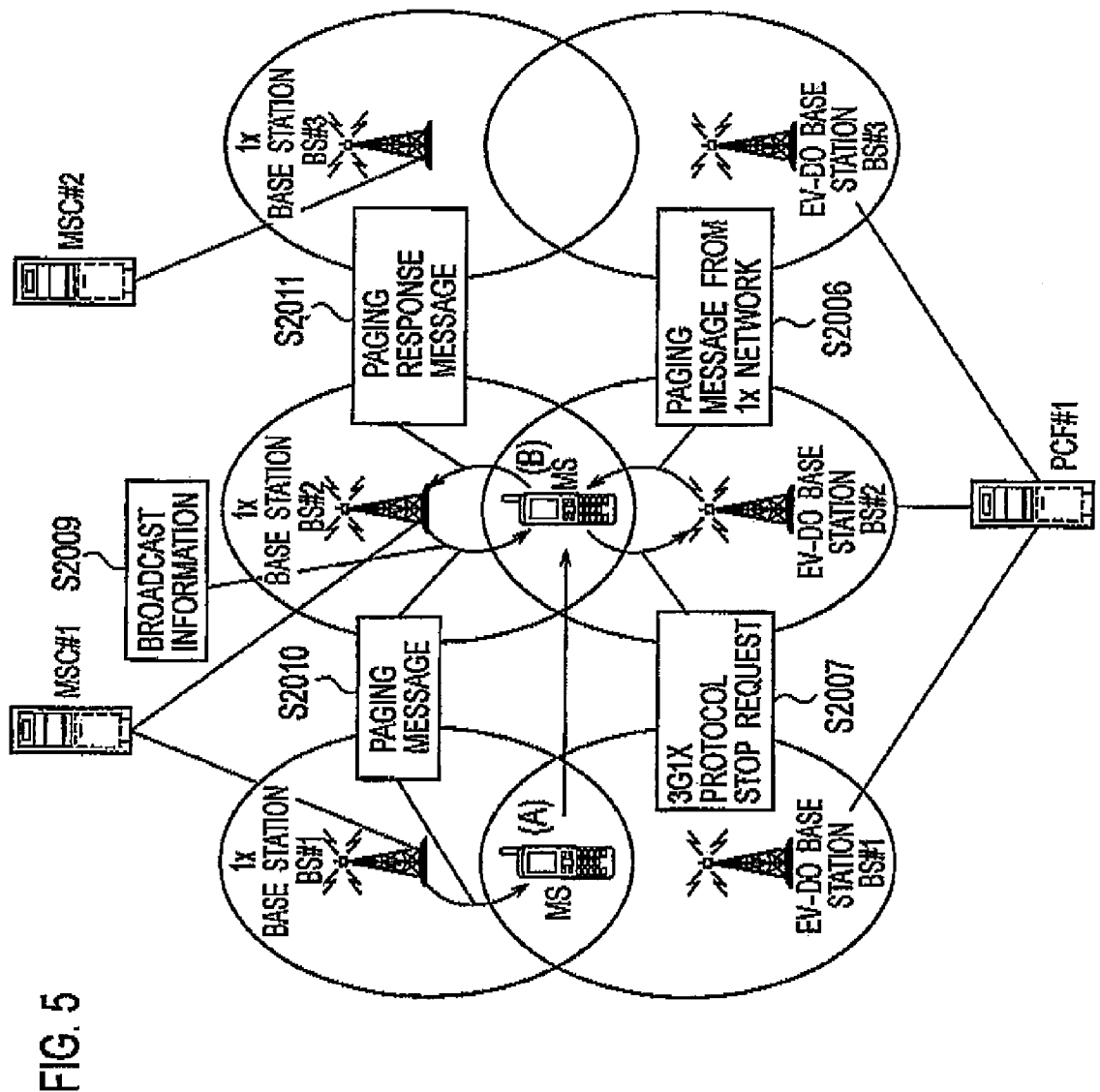

FIG. 5 is a diagram for describing operation to receive a paging message of the 1x network while using the 3G1X protocol, and to perform a received call processing in the 1x network in the mobile communication system according to the conventional art (when the mobile station MS is moved into the cover area of another 1x base station BS under the same MSC, and the 1x handoff has not occurred).

Figure 6:
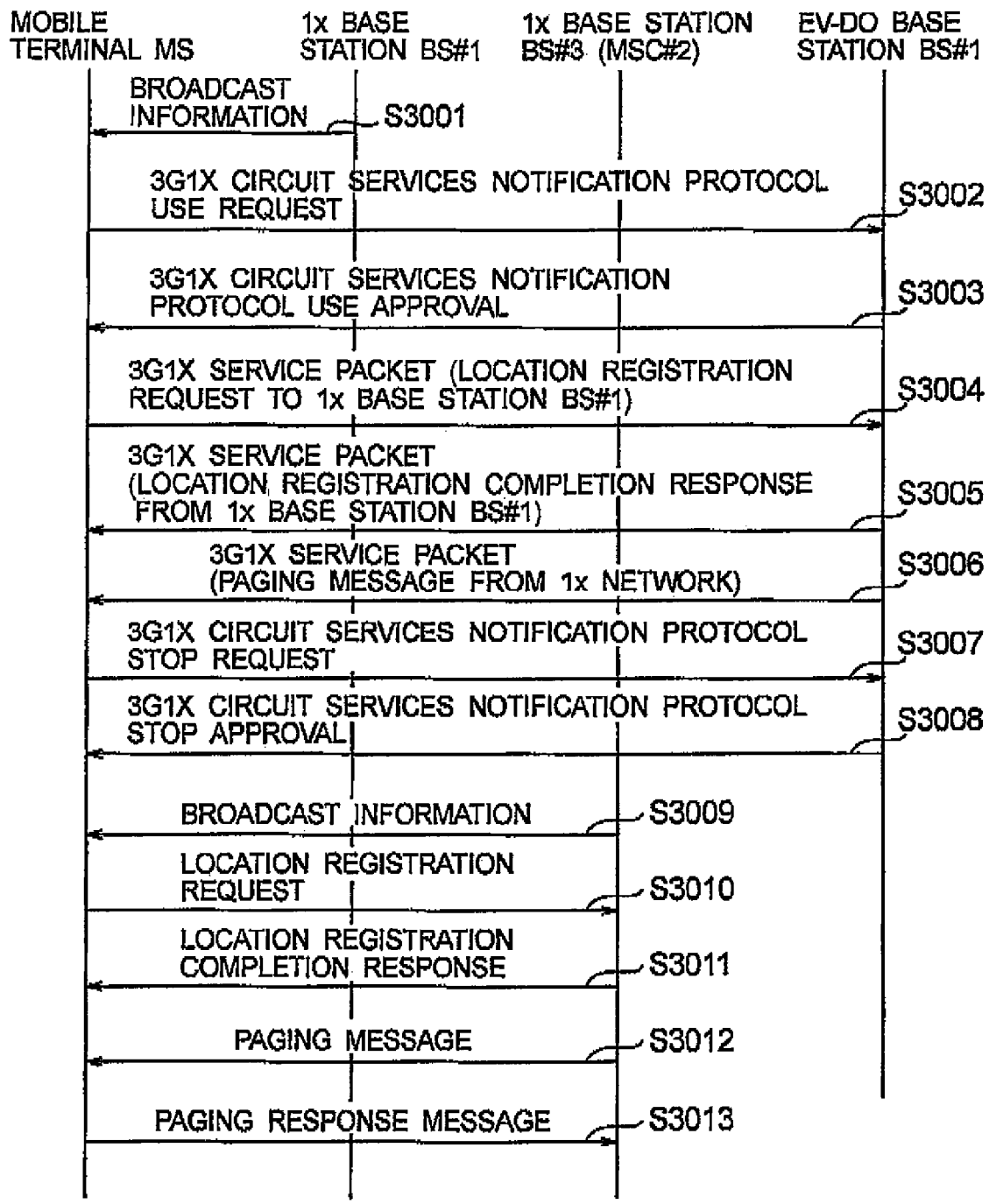

FIG. 6 is a sequence diagram showing operation to receive so a paging message of the 1x network while using the 3G1X protocol, and to perform a received call processing in the 1x network in the mobile communication system according to the conventional art (when the 1x handoff to the 1x base station BS under a different MSC has occurred).

Figure 7:
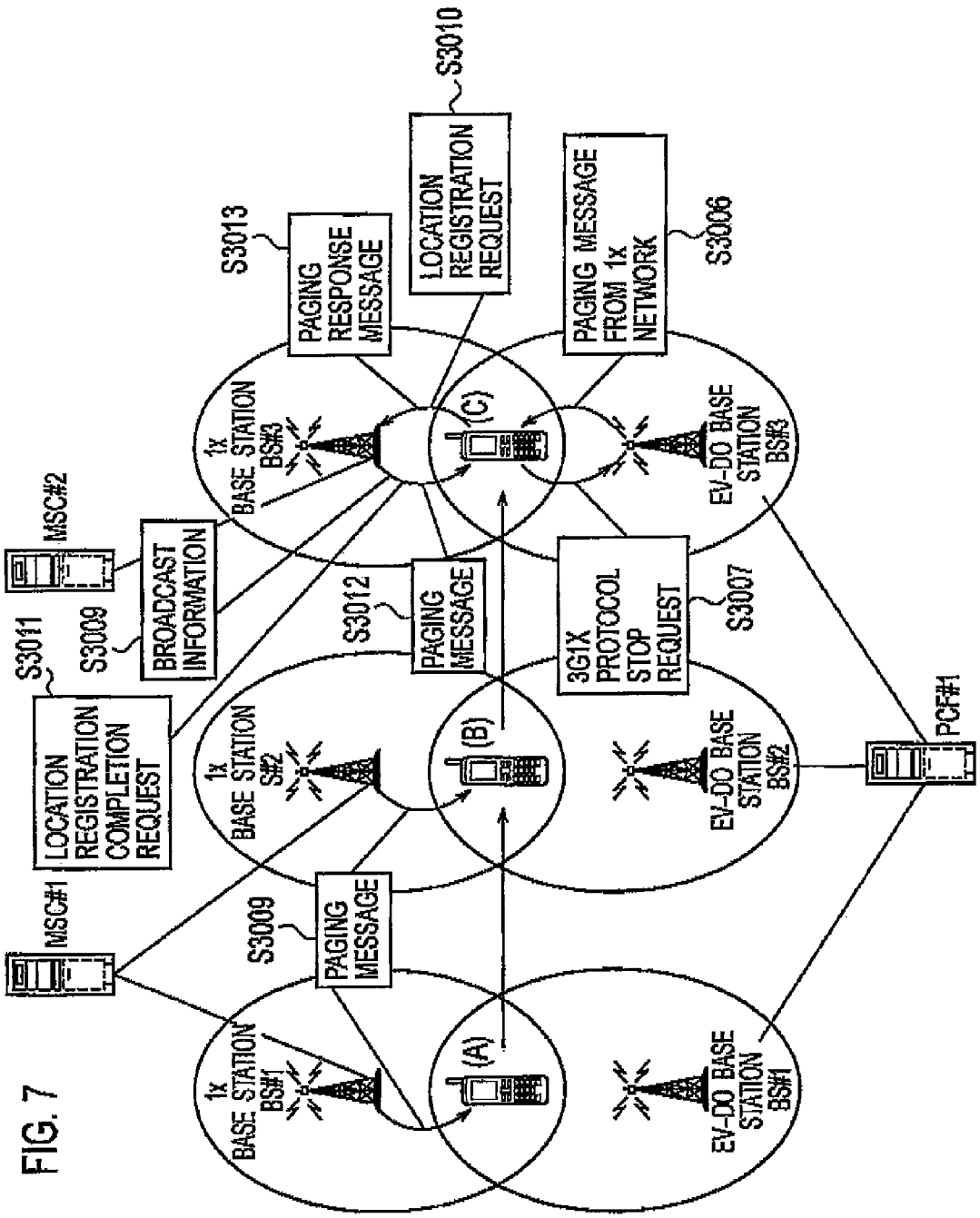

FIG. 7 is a diagram for describing operation to receive a paging message of the 1x network while using the 3G1X protocol, and to perform a received call processing in the 1x network in the mobile communication system according to the conventional art (when the 1x handoff to the 1x base station BS under a different MSC has occurred).

Figure 8:
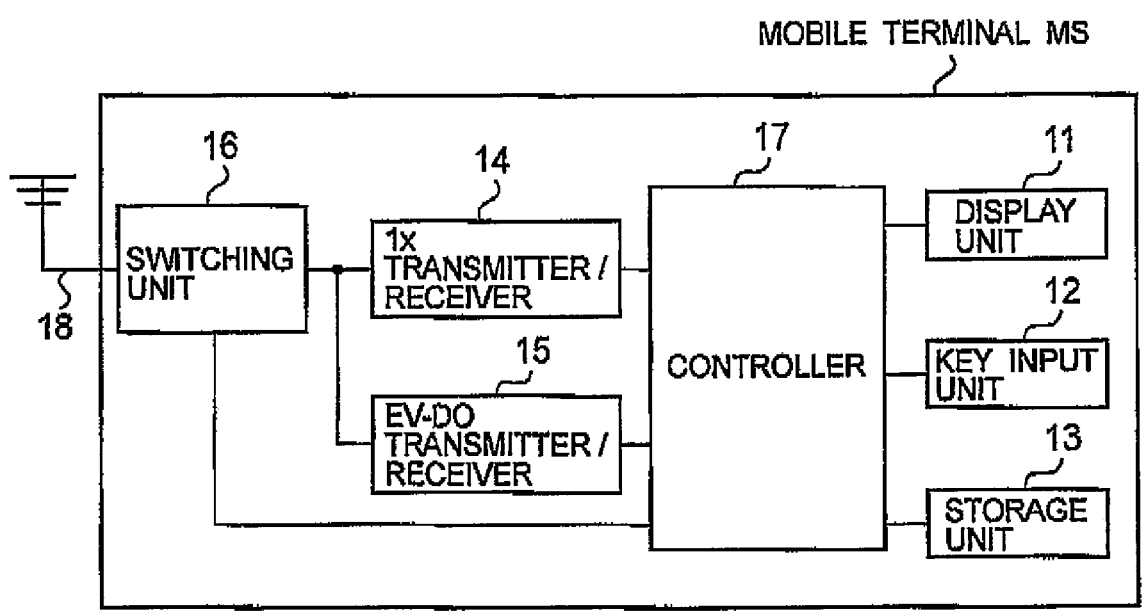

FIG. 8 is a functional block diagram of hardware of a mobile terminal according to a first embodiment of the present invention.

Figure 9:
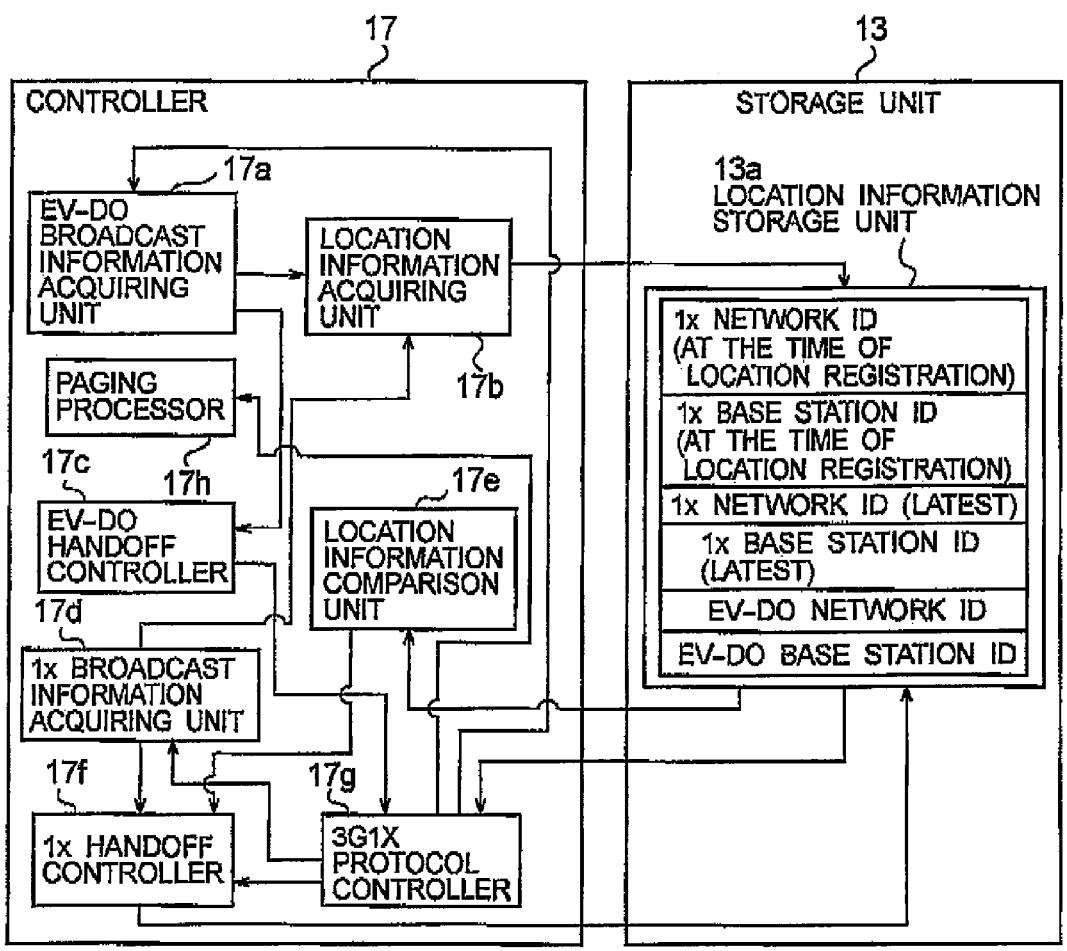

FIG. 9 is a functional block diagram of software of the is mobile terminal according to the first embodiment of the present invention.

FIG. 10 is a diagram showing an example of information managed in a mobile terminal database used in the mobile communication system according to the first embodiment of the present invention.

Figure 11:
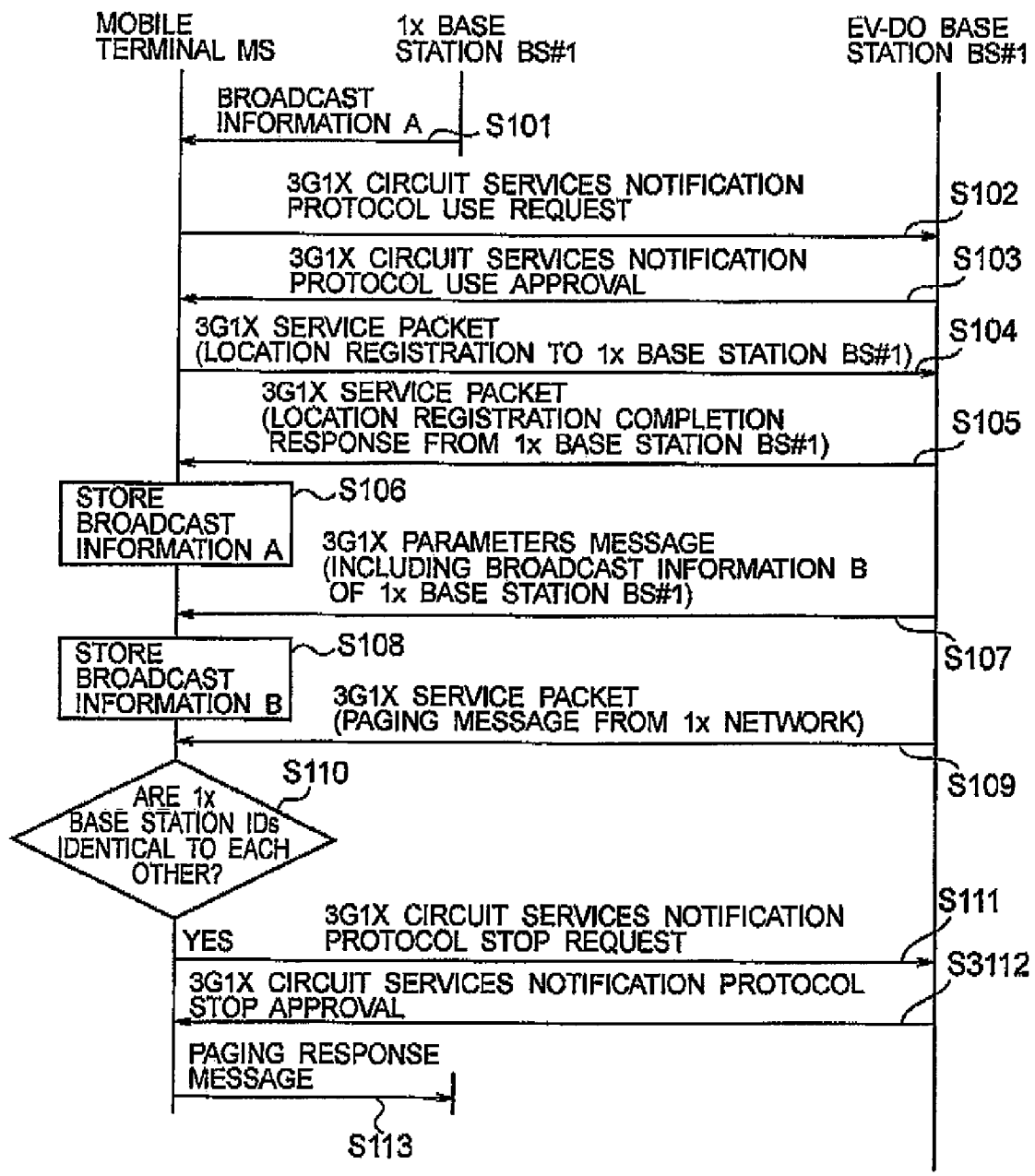

FIG. 11 is a sequence diagram showing operation to receive a paging message of a 1x network while using the 3G1X protocol, and to perform a received call processing in the 1x network in the mobile communication system according to the first embodiment of the present invention.

FIG. 12 is a sequence diagram showing operation to receive a paging message of the 1x network while using the 3G1X protocol, and to perform a received call processing in the 1x network in the mobile communication system according to the first embodiment of the present invention.

FIG. 13 is a sequence diagram showing operation to receive a paging message of the 1x network while using the 3G1X protocol, and to perform a received call processing in the 1x network in the mobile communication system according to the first embodiment of the present invention.

BEST MODE FOR CARRYING OUT THE INVENTION

Configuration of a Mobile Communication System According to a First Embodiment of the Present Invention With reference to FIG. 1, and FIGS. 8 to 10, a configuration of a mobile communication system according to the present embodiment of the present invention will be described. The "cdma2000 1x-EV DO standard" is used for the mobile communication system according to the present embodiment.

Figure 1:
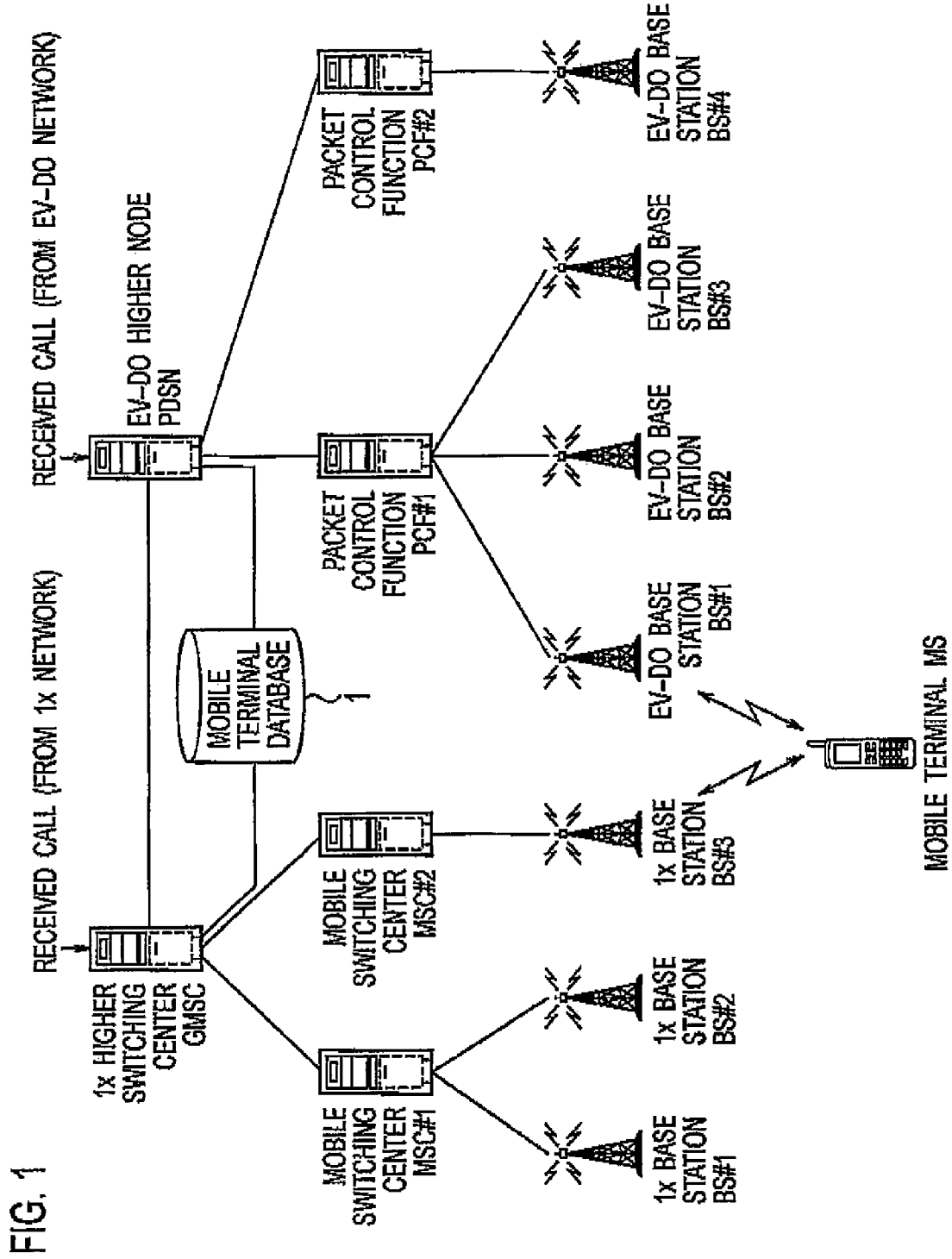
FIG. 1 is an entire configuration diagram of a common mobile communication system.
Figure 2:
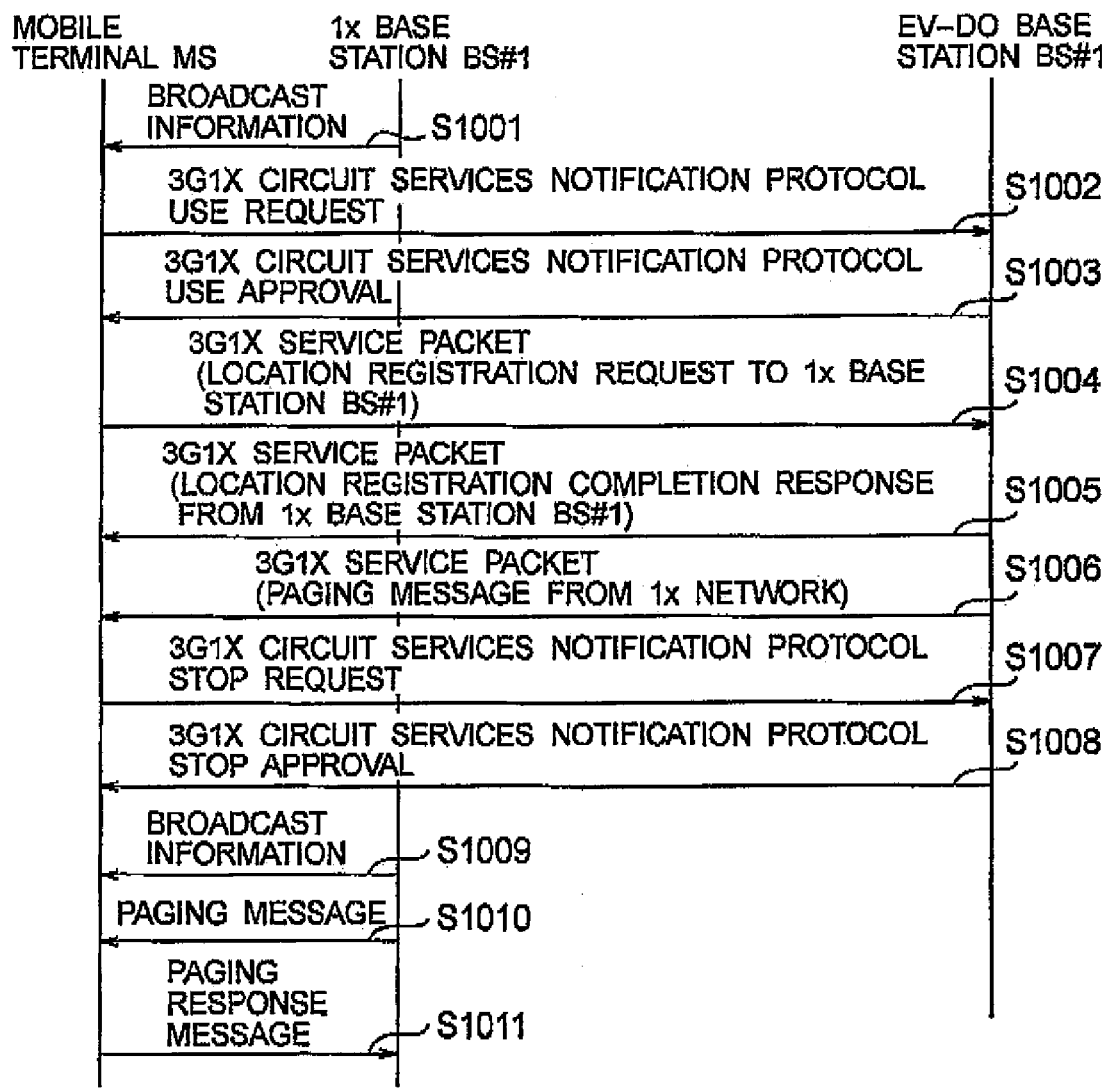
FIG. 2 is a sequence diagram showing operation to receive a paging message of a 1x network while using a 3G1X protocol, and to perform a received call processing in the 1x network in the mobile communication system according to the conventional art (when 1x handoff has not occurred).

Specifically, as shown in FIG. 1, the mobile communication system according to the present embodiment includes a mobile terminal database 1, a 1x higher order switching center GMSC, mobile switching centers MSC#1 and #2 connected to the 1x high order switching, center GMSC, 1x base stations BS#1 to #3 connected to the mobile switching center MSC#1 or #2, an EV-DO higher node PDSN, packet control functions PCF#1 and #2 connected to the EV-DO higher node PDSN, and EV-DO base stations BS#1 to #4 connected to the packet control function PCF#1 or #2.

Here, in the mobile communication system according to the present embodiment, a mobile terminal MS can communicate using a 3G1X protocol prescribing that the mobile terminal receives a so paging message from the 1x base stations 3S#1 to #3 (circuit switching network base stations) through the EV-DO base stations BS#1 to #4 (packet switching network base stations).

FIG. 8 shows hardware function of the mobile terminal MS, and FIG. 9 shows software function of the mobile terminal MS.

As shown in FIG. 8, as the hardware function, the mobile terminal MS includes a display unit 11, a key input unit 12, a storage unit 13, a 1x transmitter/receiver 14, an EV-DO transmitter/receiver 15, a switching unit 16, a controller 17, and a transmission and reception antenna 18.

The display unit 11 is formed of a liquid crystal display, etc. The key input unit 12 is formed of key input buttons, etc. The storage unit 13 is formed of a flash memory, etc.

The, 1x transmitter/receiver 14 is configured to perform radio communication with the 1x base station BS through the transmission and reception antenna 18. The EV-DO transmitter/receiver 15 is configured to perform radio communication with the EV-DO base station BS through the transmission and reception antenna is. The 1x transmitter/receiver 14 and the EV-DO transmitter/receiver 15 may be configured with different radio communication functions, and may be configured with the same radio communication function.

The switching unit 16 is configured to switch between the radio communication to be performed by the 1x transmitter/receiver 14 through the transmission and reception antenna 18 and the radio communication to be performed by the EV-DO transmitter/receiver 15 through the transmission and reception antenna 18.

The controller 17 is formed of a CPU, etc., and is configured to control each unit 11 to 16.

As shown in FIG. 9, the mobile terminal MS includes a location information storage unit 13a within the storage unit 13 as the software function. Additionally, within the controller 17, the mobile terminal MS includes an EV-DO broadcast information acquiring unit 17a, a location information acquiring unit 17b, an EV-DO handoff controller 17c, a 1x broadcast information acquiring unit 17d, a location information comparison unit 17e, a 1x handoff controller 17f, a 3G1X protocol controller 17g, and a paging processor 17h.

The location information storage unit 13a is configured so that, as location information on the mobile terminal MS, for example, a "1x network ID (at the time of location registration)," a "1x base station ID (at the time of location registration)," a "1x network ID (latest)," a "1x base station ID (latest)," an "EV-DO network ID," and an "EV-DO base station ID" are associated and stored.

The "1x base station ID (at the time of location registration)" indicates identification information of the 1x base station BS to which the mobile terminal MS performs the location registration processing before starting use of the 3G1X protocol. The "1x network ID (at the time of location registration)" indicates identification information of the mobile switching center MSC to which the 1x base station BS is connected, the mobile terminal MS performing the location registration processing to the 1x base station BS before starting use of the 3G1X protocol.

In other words, the "1x base station ID (at the time of location registration)" indicates a base station ID included in broadcast information transmitted from the 1x base station BS, before starting use of the 3G1X protocol, while the "1x network ID (at the time of location registration)" indicates a network ID (first network ID) included in the broadcast information transmitted from the 1x base station BS before starting use of the 3G1X protocol.

Moreover, the "1x base station ID (latest)" indicates the latest base station ID of the base station IDs (base station ID of the 1x base station) included in the broadcast information transmitted from the EV-DO base station after starting use of the 3G1X protocol. The "1x network ID (latest)" indicates the latest network ID (second network ID) of the network IDs (network ID of the 1x network) included in the broadcast information transmitted from the EV-DO base station after starting use of the 3G1X protocol The "EV-DO base station ID" indicates identification information of the EV-DO base station BS to which the mobile terminal MS performs the location registration processing. The "EV-DO network ID" indicates identification information of the packet control function PCF to which the EV-DO base station BS is connected, the mobile terminal MS performing the location registration processing to the EV-DO base station BS.

The EV-DO broadcast information acquiring unit 17a is configured to acquire the broadcast information from the EV-DO network (signaling message) from the EV-DO base station BS, using a control channel and traffic channel that are set for the EV-DO base station BS.

Moreover, the EV-DO broadcast information acquiring unit 17a is configured to acquire the broadcast information from the 1x network (signaling message) in addition to the broadcast information from the EV-DO network using the control channel and traffic channel that are set for the EV-DO base stations, when the EV-DO broadcast information acquiring unit 17a determines that the 3G1X protocol is in use, in response to an instruction from the 3G1X protocol controller 17g.

The location information acquiring unit 17b is configured to acquire the "EV-DO network ID" and "EV-DO base station ID" included in the broadcast information from the EV-DO network, as the location information on the mobile terminal MS, from the EV-DO broadcast information acquiring unit 17a, and to store the acquired IDs in the location information storage unit 13a.

Moreover, the location information acquiring unit 17b is configured to, when the 3G1X protocol is used, acquire the "1x network ID" and "1x base station ID" included in the broadcast information from the 1x network, as the location information on the mobile terminal MS, from the EV-DO broadcast information acquiring unit 17a, and to store the acquired IDs as the "1x network ID (latest)" and "1x base station ID (latest)" within the location information storage unit 13a.

The location information acquiring unit 17b is configured to, when the 3G1X protocol is not used, acquire the "1x network ID" and "1x base station ID" included in the broadcast information from the 1x network, as the location information on the mobile terminal MS, from the 1x broadcast information acquiring unit 17d, and to store the acquired IDS as the "1x network ID (at the time of location registration)" and "1x base station ID (at the time of location registration)" within the location information storage unit 13a.

The EV-DO handoff controller 17c is configured to perform control concerning an EV-DO handoff processing on the basis of the "EV-DO base station ID" included in the broadcast information from the EV-DO network acquired by the EV-DO broadcast information is acquiring unit 17a.

Specifically, the EV-DO handoff controller 17c is configured to perform the location registration processing to a handoff destination EV-DO base station BS by transmitting the location registration request to the handoff destination EV-DO base station BS, when the EV-DO base station BS before the handoff is different from the handoff destination EV-DO base station BS that is identified by the "EV-DO base station ID" included in the broadcast information from the EV-DO network acquired by the EV-DO broadcast information acquiring unit 17a.

When an EV-DO handoff processing or 1x handoff processing is performed for the mobile terminal MS, the EV-DO handoff controller 17c is configured to notify the 3G1X protocol controller 17g that the handoff processing is performed.

The 1x broadcast information acquiring unit 17d is configured to, when the 3G1X protocol is not used, acquire the broadcast information from the 1x network (signaling message) a using the control channel and traffic channel that are set for the 1x base station BS.

The location information comparison unit 17e is configured to compare the "1x network ID (at the time of location registration)" and the "1x network ID (at the time of the latest)" that are stored in the location information storage unit 13a, and to notify the 1x handoff controller of the comparison result.

Alternatively, the location information comparison unit 17e may be configured to compare the "1x base station ID (at the time of location registration)" and the "1x base station ID (at the time of the latest)" that are stored in the location information storage unit 13a, and to notify the 1x handoff controller 17f of the comparison result.

The 1x handoff controller 17f is configured to perform control concerning the 1x handoff processing on the basis of the "1x base station ID" included in the broadcast information from the 1x network acquired by the 1x broadcast information acquiring unit 17d.

Specifically, the 1x handoff controller 17f is configured to perform the location registration processing to the handoff destination 1x base station BS by transmitting the location registration request to the handoff destination 1x base station BS, when the 3G1X protocol is not used, and when the 1x base station BS before the handoff is different from the handoff destination 1x base station BS that is identified by the "1x base station ID" included in the broadcast information from the 1x network acquired by the 1x broadcast information acquiring unit 17f.

The 1x handoff controller 17f is configured, when performing the 1x handoff processing to the mobile terminal MS, to update the location information storage unit 13a on the basis of the "base station ID" of the handoff destination 1x base station BS, and the "network ID" that identifies the mobile switching center MSC connected to the handoff destination 1x base station BS.

Moreover, the 1x handoff controller 17f is configured to perform the location registration processing to the 1x base station BS identified by the "1x base station ID (latest)" without receiving the broadcast information from the 1x base station BS identified by the "1x base station ID (at the time of location registration)" and from the 1x base station BS identified by the "1x base station ID (latest)," after use of the 3G1X protocol is stopped in response to reception of the paging message addressed to the mobile terminal MS from the originating terminal through the 1x network, when the "1x network ID (at the time of location registration)" is different from the "1x network ID (at the time of the latest)."

The 3G1X protocol controller 17g is configured to perform control over use and stop of use of the 3G1X protocol in the mobile terminal MS.

The paging processor 17h is configured to receive the paging message (for the EV-DO) for informing that there is a received call addressed to the mobile terminal MS from the originating terminal through the EV-DO network.

Moreover, the paging processor 17h is configured to receive the paging message (for the 1x) for informing that there is a received call (call) addressed to the mobile terminal MS from the originating terminal via the 1x network through the EV-DO base station BS, after use of the 3G1X protocol is started.

Moreover, the paging processor 17h is configured to transmit a paging response message (for the 1x) to the paging message addressed to the mobile terminal MS to the 1x base station BS without receiving the broadcast information from the 1x base station BS, in response to the paging message (for the 1x) addressed to the mobile terminal MS received through the EV-DO network, after use of the 3G1X protocol is stopped Moreover, the paging processor 17h is configured to transmit the paging response message (for the 1x) to the paging message addressed to the mobile terminal MS (for the 1x) to the 1x base station BS after completion of the location registration processing to the 1x base station BS identified by the "1x base station ID (latest)."

The mobile terminal MS according to the present embodiment may be a device thus configured, and may be a radio communication terminal, may be a radio module, and may be a card terminal.

As shown in FIG. 10, the mobile terminal database 1 is configured so that the "mobile terminal ID," the "1x network ID," the "1x base station ID," the "EX-DO network ID," the "EV-DO base station ID," and a "3G1X protocol operation situation" may be associated with each other and stored.

The "mobile terminal ID" indicates the identification information of the mobile terminal MS. The "1x base station ID" indicates the identification information of the 1x base station BS to which the mobile terminal MS performs the location registration processing. The "1x network ID" indicates the identification information of the mobile switching center MSC to which the 1x base station BS is connected, the mobile terminal MS performing the location registration processing to the 1x base station BS. The "EV-DO base station ID" indicates the identification information of the EV-DO base station BS to which the mobile terminal MS performs the location registration processing. The "EV-DO network ID" indicates the identification information of the packet control function PCF to which the EV-DO base station BS is connected, the mobile terminal MS performing the location registration processing to the EV-DO base station BS.

The "3G1X protocol operation situation" indicates whether the 3G1X protocol is used in the mobile terminal MS.

The mobile terminal database 1 may be formed of one database, or may be formed of a plurality of databases.

When there is a received call addressed to the mobile terminal MS from a communication partner terminal through the 1x network, the 1x higher order switching center GMSC determines whether the 3G1X protocol is used in the mobile terminal MS, with reference to the mobile terminal database 1.

Here, when determining that the 3G1X protocol is used in the mobile terminal MS, the 1x higher order switching center GMSC notifies the packet control function PCF that there is the received call addressed to the mobile terminal MS from the communication partner terminal through the 1x network, the packet control function PCF being identified by the "EV-DO network ID" associated with the mobile terminal MS. Then, the packet control function PCF notifies the mobile terminal MS of that notification through the EV-DO base station BS under the packet control function PCF.

On the other hand, when determining that the 3G1X protocol is not used in the mobile terminal MS, the 1x higher order switching center GMSC transfers the received call, addressed to the mobile terminal MS from the communication partner terminal through the 1x network, to the mobile switching center MSC identified by the "1x network ID" associated with the mobile terminal MS. Then, the mobile switching center MSC notifies the mobile terminal MS of the received call through the 1x base station BS under the mobile switching center MSC.

The packet control function PCF or the EV-DO higher node PDSN is configured to update the "3G1X protocol operation situation" in the mobile terminal database 1 in response to the 3G1X protocol use request or 3G1X protocol stop request received from the EV-DO base station BS.

Either of the packet control function PCF and the EV-DO higher node PDSN, or either of the mobile switching center MSC and the 1x high order switching center GMSC is configured to update the content of the mobile terminal database 1 in response to location registration processing performed by the EV-DO base station BS or the 1x base station BS.

Operation of a Mobile Communication System According to the First Embodiment of the Present Invention With reference to FIGS. 11 to 13, operation of the mobile communication system according to the present embodiment of the present invention will be described.

First, with reference to FIG. 11, in the mobile communication system according to the present embodiment, operation to receive the paging message of the 1x network while using the 3G1X protocol, and to perform a received call processing in the 1x network will be described.

As shown in FIG. 11, at Step S101, the mobile terminal MS receives broadcast information A from the 1x base station BS#1, the broadcast information including the base station ID that identifies the 1x base station BS#1 and the network ID that identifies the mobile switching center MSC#1 connected to the 1x base station BS#1.

At Step S102, the mobile terminal MS transmits the "3G1X protocol use request" for requesting start of use of the 3G1X protocol to the EV-DO base station BS#1 to which the location registration processing is performed.

At Step S103, in response to the received "3G1X protocol use request," the EV-DO base station BS#1 transmits the "3G1X protocol use approval" for approving start of use of the 3G1X protocol to the mobile terminal MS.

At Step S104, the mobile terminal MS starts use of the 3G1X protocol in response to the received "3G1X protocol use approval." Then, the mobile terminal MS transmits the "3G1X Service Packet (DO packet including the signaling message of the 1x network)" to the EV-DO base station BS#1. The "3G1X Service Packet" is for informing the EV-DO base station BS#1 of the location registration request for performing the location registration processing to is the 1x base station BS#1.

Here, the packet control function PCF#1 connected to the EV-DO base station BS#5 changes the "3G1X protocol operation situation" of the mobile terminal MS into "in use (o)" in the mobile terminal database 1.

At Step S105, to the mobile terminal MS, the EV-DO base Station BS#1 transmits the "3G1X Service Packet" for informing the mobile terminal MS of the location registration completion response, the location registration completion response indicating that location registration processing to the 1x base station BS#1 is completed.

The EV-DO base station BS#1 sets the 1x base station BS#1 so as the "1x base station ID" of the mobile terminal MS in the mobile terminal database 1 by performing the location registration processing for the mobile terminal MS to the 1x base station BS#1.

At Step S106, after the location registration processing to the 1x base station BS#1 is completed, the mobile terminal MS stores the broadcast information A received at Step S101.

At Step S107, from the EV-DO base station BS#1, the mobile terminal MS receives a "3G1X Parameters message (System Parameters Message or Extended System Parameters Message)" for informing the mobile terminal MS of broadcast information B. The broadcast information B includes the base station ID that identifies the 1x base station BS#1 and the network ID that identifies the mobile switching center MSC#1 connected to the 1x base station BS#1.

The "3G1X Parameters message" is periodically transmitted.

At Step S108, the mobile terminal MS stores the broadcast information B included in the received "3G1X Parameters message."

At Step S109, when, through the 1x higher order switching center GMSC, the EV-DO higher node PDSN, and the packet control function PCF#1, the EV-DO base station BS#1 is informed of the received call addressed to the mobile terminal MS from the originating terminal via the 1x network, the EV-DO base station BS#1 transmits the "3G1X Service Packet" to the mobile terminal MS to notify the mobile terminal MS of the paging message addressed to the mobile terminal MS.

At Step S110, the mobile terminal MS compares the "1x base station ID" included in the broadcast information A with the "1x base station ID" included in the broadcast information B, and determines whether these IDs are identical to each other.

At Step S111, to the EV-DO base station BS#1, the mobile terminal MS transmits the "3G1X protocol stop request" for requesting stop of use of the 3G1X protocol.

At Step S112, the EV-DO base station BS#1 transmits the "3G1X protocol stop approval" for approving stop of use of the 3G1X protocol to the mobile terminal MS in response to the received "3G1X protocol stop request."

Here, the packet control function PCF#1 connected to the is EV-DO base station BS#1 changes the "3G1X protocol operation situation" of the mobile terminal MS into "out of use (x)" in the mobile terminal database 1.

In an example of FIG. 11, at Step S110, it is determined that both are identical to each other. Therefore, at Step S113, the mobile terminal MS determines that the mobile terminal MS has not fallen under the necessity for "1x handoff processing" while using the 3G1X protocol (Step S104 to S112) because the base station ID (1x base station BS#1) included in the broadcast information A received by the mobile terminal MS at Step S101 is not changed. Then, by responding to the paging message, from the 1x base station BS#1, informed through the EV-DO base station BS#1 at Step S109, the mobile terminal MS starts the communication with the originating terminal (communication partner terminal) through the 1x network, without receiving the broadcast information from the 1x base station BS#1 again and without receiving the paging message addressed to the mobile terminal MS from the 1x base station BS#1 again.

Secondly, with reference to FIG. 12, operation will be described when the mobile terminal MS moves into a cover area of another different 1x base station BS under the same mobile switching center MSC while using the 3G1X protocol, that is, when the base station ID included in the broadcast information received in the mobile terminal MS after stopping the 3G1X protocol is changed into the base station ID of the different 1x base station BS under the same mobile switching center MSC.

As shown in FIG. 12, operation from Step S201 to S208 is the same as the above-mentioned operation from Step S101 to S108.

At Steps S209 and S210, since the EV-DO base station BS#2 identified by the "EV-DO base station ID" included in the broadcast information from the EV-DO network is different from the EV-DO base station BS#1, the mobile terminal MS transmits the location registration release request to the EV-DO base station BS#1. Simultaneously, the mobile terminal MS performs the location registration processing (EV-DO handoff) to the EV-DO base station BS#2 by transmitting the location registration request to the EV-DO base station BS#2.

At Step S211, from the EV-DO base station BS#2, the mobile terminal MS receives the "3G1X Parameters message" for informing the mobile terminal MS of broadcast information C. The broadcast information C includes the base station ID that identifies the 1x base station BS#2 and the network ID that identifies the mobile switching center MSC#1 connected to the 1x base station BS#2.

At Step S212, the mobile terminal MS stores the broadcast information C included in the received "3G1X Parameters message."

At Step S213, when, through the 1x higher order switching center GMSC, the EV-DO higher node PDSN, and the packet control function PCF#1, the EV-DO base station BS#2 is informed of the received call addressed to the mobile terminal MS from the originating terminal via the 1x network, the EV-DO base station BS#2 transmits the "3G1X Service Packet" for informing the mobile terminal MS of the paging message addressed to the mobile terminal MS to the mobile terminal MS.

At Step 8214, the mobile terminal MS compares the "1x base station ID" included in the broadcast information A with the "1x base station ID" included in the broadcast information C, and determines whether these IDs are identical to each other.

Since the above two are different from each other in an example of FIG. 12, at Step S215, the mobile terminal MS compares the "1x network ID" included in the broadcast information A with the "1x network ID" included in the broadcast information C, and determines whether these IDs are identical to each other.

At Step S216, to the EV-DO base station BS#2, the mobile terminal MS transmits the "3G1X protocol stop request" for requesting use stop of the 3G1X protocol.

At Step S217, in response to the received "3G1X protocol stop request," the EV-DO base station BS#2 transmits the "3G1X protocol stop approval" for approving stop of use of the 3G1X protocol to the mobile terminal MS.

Here, the packet control function PCF#1 connected to the EV-DO base station BS#2 changes the "3G1X protocol operation situation" of the mobile terminal MS into "out of use (x)" in the mobile terminal database 1.

In an example of FIG. 12, at Step S215, it is determined that both are identical to each other. Therefore, at Step S218, the mobile terminal MS determines that the paging area in which the paging message of the 1x network to the mobile terminal MS is transmitted is not changed while using the 3G1X protocol (Step S204 to S217), because the network ID (mobile switching center MSC#1 to which the 1x base station BS#1 is connected) included in the broadcast information A received by the mobile terminal MS at Step S201 is not changed. Then, by responding to the paging message, from the 1x base station BS#2, informed through the EV-DO base station BS#2 at Step S211, the mobile terminal MS starts the communication with the originating terminal through the 1x network, without receiving the broadcast information from the 1x base station BS#2 again, and without receiving the paging message addressed to the mobile terminal MS from the 1x base station BS#2 again.

Thirdly, with reference to FIG. 13, operation will be described when the Mobile terminal MS has fallen under the necessity for the "1x handoff processing" between the 1x base stations BS under the different mobile switching center MSC while using the 3G1X protocol, that is, when the base station ID included in the broadcast information received in the mobile terminal MS is changed into the base station ID of another 1x base station BS under the different mobile switching center MSC.

As shown in FIG. 13, operation from Step S301 to S317 is the same as the above-mentioned operation from Step S201 to S217.

In an example of FIG. 13, at Step S315, it is determined that both are different from each other. Therefore, at Step S318, the mobile terminal MS determines that the mobile terminal MS has fallen under the necessity for the "1x handoff processing" between the 1x base station BS#1 and the 1x base station BS#3 under the is different mobile switching centers MSC#1 and MSC#2 while using the 3G1X protocol (Step S304 to S317), because the base station ID (1x base station BS#1) included in the broadcast information A received by the mobile terminal MS at Step S301 is changed into the base station ID (1x base station BS#3) of another 1x base station BS under the different mobile switching center MSC#2.

Here, the 1x network recognizes that the mobile terminal MS exists within the cover area of the 1x base station BS under the mobile switching center MSC#1. The 1x base station BS#1 and BS#2 under the mobile switching center MSC#1 inform the mobile terminal MS of the paging message addressed to the mobile terminal MS from the originating terminal through the 1x network Accordingly, in this situation, the mobile terminal MS cannot receive the paging message addressed to the mobile terminal MS, and cannot start the communication with the originating terminal through the 1x network. Then, the mobile terminal MS transmits the location registration request to the 1x base station BS#3.

At Step S319, the 1x base station BS#3 performs the location registration processing for the mobile terminal MS in response to the received location registration request, and to the mobile terminal MS, transmits the location registration completion response for informing that the location registration processing is completed.

The 1x base station BS#3 sets the 1x base station BS#3 as the "1x base station ID" of the mobile terminal MS in the mobile terminal database 1 by performing the location registration processing for this mobile terminal MS to the 1x base station BS#3.

At Step S320, when the mobile terminal MS receives the location registration completion response transmitted from the 1x base station BS#3, by responding to the paging message, from the 1x base station BS#3, informed through the EV-DO base station BS#2 at Step S311, the mobile terminal MS starts the communication with the originating terminal through the 1x network, without receiving the broadcast information from the 1x base station BS#3 again, and without receiving the paging message addressed to the mobile terminal MS from the 1x base station BS#3 again.

Effects and Advantages of the Mobile Communication System According to the First Embodiment of the Present Invention According to the mobile communication system according to the present embodiment, the mobile terminal MS is configured to stop use of the 3G1X protocol in response to reception of the paging message which is addressed to the mobile terminal MS from the originating terminal through the 1x network, and which is received through the EV-DO base station BS, and subsequently, to transmit the paging response message for the paging message addressed to the mobile terminal MS to the 1x base station BS, without receiving the broadcast information from the 1x base station BS. Thereby, the time needed for the operation to perform the received call processing in the 1x network after receiving the paging message of the 1x network while using the 3G1X protocol can be shortened.

According to the mobile communication system according to the present embodiment, the mobile terminal MS is configured to stop use of the 3G1X protocol in response to reception of the paging message which is addressed to the mobile terminal MS from the originating terminal through the 1x networks and which is received through the EV-DO base station BS, subsequently, to perform the location registration processing to the 1x base station BS#3 without receiving the broadcast information from the 1x base station BS#1 and BS#3 again,, and to transmit the paging response message for the paging message addressed to the mobile terminal MS to the 1x base station BS#3, when the "1x network ID" included in the broadcast information A received before use of the 3G1X protocol is started is different from the "1x network ID" included in the broadcast information B or C received through the EV-DO base station BS after use of the 3G1X protocol is started. Thereby, it is possible to reduce a probability that the paging message addressed to the mobile terminal MS cannot be received, and simultaneously, it is possible to shorten the time needed for the operation to receive the paging message of the 1x network while so using the 3G1X protocol and to perform the received call processing in the 1x network.

Furthermore, the 1x network can grasp the location of the mobile terminal MS (the 1x base station BS to which the location a registration is performed) by using a configuration in which the location registration processing (handoff processing) of the 1x base station BS is performed through the EV-DO base station BS, even when the mobile terminal MS is moved into the cover area of the 1x base station BS under a different mobile switching center MSC while using the 3G1X protocol.

Therefore, even when the mobile terminal MS receives the paging message off the 1x network through the EV-DO base station BS while using the 3G1X protocol, after stop of the 3G1X protocol, it is possible to transmit the response of the paging message, received through the EV-DO base station BS, to the 1x base station BS (#3) without performing location registration processing to the 1x base station BS (#3) as shown in FIG. 13.

The embodiment described above mentions that when the mobile terminal MS moves into the cover area of the 1x base station BS under a different mobile switching center MSC while using the 3G1X protocol, the location registration processing of the 1x base station BS is performed through the EV-DO base station BS, but not limited to this. The location registration processing of the 1x base station BS may be performed through the EV-DO base station BS when the mobile terminal MS is moved into the cover area of a different 1x base station BS under the same mobile switching center MSC while using the 3G1X protocol.

Entire contents of Japanese Patent Application No. (filed on Apr. 26, 2006) are incorporated herein by reference.

As mentioned above, although the present invention has been described in detail using the above-mentioned embodiment, it is obvious to persons skilled in the art that the present invention will not be limited to the embodiment described in the specification. The modified and alternative modes of the present invention can be carried out, without deviating from the meaning and scope of the present invention defined by description of the scope of claims. Accordingly, description of the specification is only for exemplary explanation, and does not have any restrictive meaning to the present invention.

INDUSTRIAL APPLICABILITY

As described above, according to the present invention, a mobile communication method and a mobile terminal can be provided in which the operation to perform the received call processing in the 1x network after receiving the paging message of the 1x network while using the 3G1X protocol can be faster.

The invention claimed is:

1. A mobile communication method for performing communications using a protocol prescribing that a mobile terminal receives a paging message from a circuit switching network base station through a packet switching network base station, the mobile communication method comprising the steps of:
   receiving, at the mobile terminal, the paging message directly from the packet switching network base station after starting use of the protocol; and
   transmitting, from the mobile terminal to the circuit switching network base station, a paging response message for the paging message addressed to the mobile terminal without receiving broadcast information from the circuit switching network base station, after stopping use of the protocol in response to reception of the paging message addressed to the mobile terminal,
   wherein the paging message includes the broadcast information, wherein the broadcast information is used by the mobile terminal for determining whether a location registration is necessary.

2. The mobile communication method according to claim 1, further comprising the steps of:
   receiving, at the mobile terminal, first broadcast information from a first circuit switching network base station before starting use of the protocol, the first broadcast information including a first network ID that identifies a mobile switching center connected to the first circuit switching network base station;
   receiving, at the mobile terminal, second broadcast information from the packet switching network base station after starting use of the protocol, the second broadcast information including a second network ID that identifies a mobile switching center connected to a second circuit switching network base station; and
   transmitting a paging response message for the paging message addressed to the mobile terminal to the second circuit switching network base station, while performing a location registration processing to the second circuit switching network base station without receiving the broadcast information from the first and second circuit switching network base stations, after stopping use of the protocol in response to reception of the paging message addressed to the mobile terminal when the first network ID is different from the second network ID, at the mobile terminal.

3. A mobile terminal configured to perform communications using a protocol prescribing that the mobile terminal receives a paging message from a circuit switching network base station through a packet switching network base station, the mobile terminal comprising:
   a paging message receiver configured to receive the paging message directly from the packet switching network base station after use of the protocol is started; and
   a paging response message transmitter configured to transmit, to the circuit switching network base station, a paging response message for the paging message addressed to the mobile terminal without receiving broadcast information from the circuit switching network base station, after stopping use of the protocol in response to reception of the paging message addressed to the mobile terminal, wherein the paging message includes the broadcast information, wherein the broadcast information is used by the mobile terminal for determining whether a location registration is necessary.

4. The mobile terminal according to claim 3, further comprising:
   a first broadcast information receiver configured to receive first broadcast information from a first circuit switching network base station before use of the protocol is started, the first broadcast information including a first network ID that identifies a mobile switching center connected to the first circuit switching network base station;
   a second broadcast information receiver configured to receive second broadcast information from the packet switching network base station after use of the protocol is started, the second broadcast information including a second network ID that identifies a mobile switching center connected to a second circuit switching network base station;
   a comparison unit configured to compare the first network ID with the second network ID; and
   a location registration processor configured to perform a location registration processing to the second circuit switching network base station without receiving broadcast information from the first and second circuit switching network base stations, after stopping use of the protocol in response to reception of the paging message addressed to the mobile terminal, when the first network ID is different from the second network ID, wherein
   the paging response message transmitter is configured to transmit, to the second circuit switching network base station, a paging response message for the paging message addressed to mobile terminal, after completion of the location registration processing to the second circuit switching network base station.

5. A mobile communication method for performing communications using a protocol prescribing that a mobile terminal receives a paging message from a circuit switching network base station through a packet switching network base station, the mobile communication method comprising the steps of:
   receiving, at the mobile terminal, the paging message directly from the packet switching network base station after starting use of the protocol; and
   transmitting, from the mobile terminal to the circuit switching network base station, a paging response message for the paging message addressed to the mobile terminal without receiving broadcast information from the circuit switching network base station, after stopping use of the protocol in response to reception of the paging message addressed to the mobile terminal,
   wherein the paging message includes the broadcast information, wherein the broadcast information is used by the mobile terminal for determining whether a location registration is necessary.

6. A mobile terminal configured to perform communications using a protocol prescribing that the mobile terminal receives a paging message from a circuit switching network base station through a packet switching network base station, the mobile terminal comprising:
   a paging message receiver configured to receive the paging message directly from the packet switching network base station after use of the protocol is started; and
   a paging response message transmitter configured to transmit, to the circuit switching network base station, a paging response message for the paging message addressed to the mobile terminal without receiving broadcast information from the circuit switching network base station, after stopping use of the protocol in response to reception of the paging message addressed to the mobile terminal,
   wherein the paging message includes the broadcast information, wherein the broadcast information is used by the mobile terminal for determining whether a location registration is necessary.

\* \* \* \* \*